United States Patent [19]
Okamoto

[11] Patent Number: 5,390,306
[45] Date of Patent: Feb. 14, 1995

[54] PIPELINE PROCESSING SYSTEM AND MICROPROCESSOR USING THE SYSTEM

[75] Inventor: Kousei Okamoto, Kunitachi, Japan

[73] Assignee: Kabushiki Kaisha Toshiba, Kawaski, Japan

[21] Appl. No.: 940,749

[22] Filed: Sep. 8, 1992

Related U.S. Application Data

[63] Continuation of Ser. No. 517,542, Apr. 27, 1990, abandoned, which is a continuation of Ser. No. 934,860, Nov. 25, 1986, abandoned.

[30] Foreign Application Priority Data

Mar. 27, 1986 [JP] Japan .................. 61-067050

[51] Int. Cl.⁶ .................................. G06F 9/30
[52] U.S. Cl. .................. 395/375; 364/942.8; 364/946.9; 364/948.34; 364/973; 364/DIG. 2
[58] Field of Search .................. 364/DIG. 1, DIG. 2, 364/375; 395/600, 800, 400

[56] References Cited

U.S. PATENT DOCUMENTS

| | | | |
|---|---|---|---|
| 3,725,868 | 4/1973 | Malmer, Jr. et al. | 364/200 |
| 3,949,372 | 4/1976 | Brioschi | 364/200 |
| 4,398,245 | 8/1983 | Fujita | 364/200 |
| 4,415,969 | 11/1983 | Bayliss et al. | 364/200 |
| 4,454,578 | 6/1984 | Matsumoto et al. | 395/375 |
| 4,471,432 | 9/1984 | Wilhite et al. | 364/200 |
| 4,481,581 | 11/1984 | Johnson | 364/200 |
| 4,530,050 | 7/1985 | Fukunaga et al. | 395/375 |
| 4,553,205 | 11/1985 | Porchia | 364/300 |
| 4,644,466 | 2/1987 | Saito | 364/200 |
| 4,658,355 | 4/1987 | Hatakeyama et al. | 364/200 |
| 4,667,290 | 5/1987 | Goss et al. | 395/700 |
| 4,685,058 | 8/1987 | Lee et al. | 364/200 |
| 4,750,112 | 6/1988 | Jones et al. | 364/200 |
| 4,760,519 | 7/1988 | Papworth et al. | 364/200 |
| 4,791,551 | 12/1988 | Garde | 364/200 |
| 4,797,808 | 1/1989 | Bellay et al. | 364/200 |
| 4,812,989 | 3/1989 | Maier et al. | 395/375 |
| 4,823,252 | 4/1989 | Horst et al. | 364/900 |
| 4,890,218 | 12/1989 | Bram | 395/375 |
| 4,914,578 | 4/1990 | MacGregor et al. | 364/200 |
| 4,975,837 | 12/1990 | Woodward et al. | 364/200 |

FOREIGN PATENT DOCUMENTS 2077965A 12/1981 United Kingdom.

OTHER PUBLICATIONS

1985 IEEE International Solid-State Circuits Conference, pp. 42–43.

Primary Examiner—Thomas G. Black
Assistant Examiner—Maria N. von Buhr
Attorney, Agent, or Firm—Foley & Lardner

[57] ABSTRACT

A pipe-line processing system and its microprocessor using the system in which each command having a plurality of memory operands is divided into a plurality of inner commands, each having a single memory operand and wherein the inner commands are executed in parallel. Accordingly, calculation of at least one effective address of one memory operand and the processing of the other operand can be performed simultaneously, thereby realizing a high speed operation with a simple circuit construction.

6 Claims, 3 Drawing Sheets

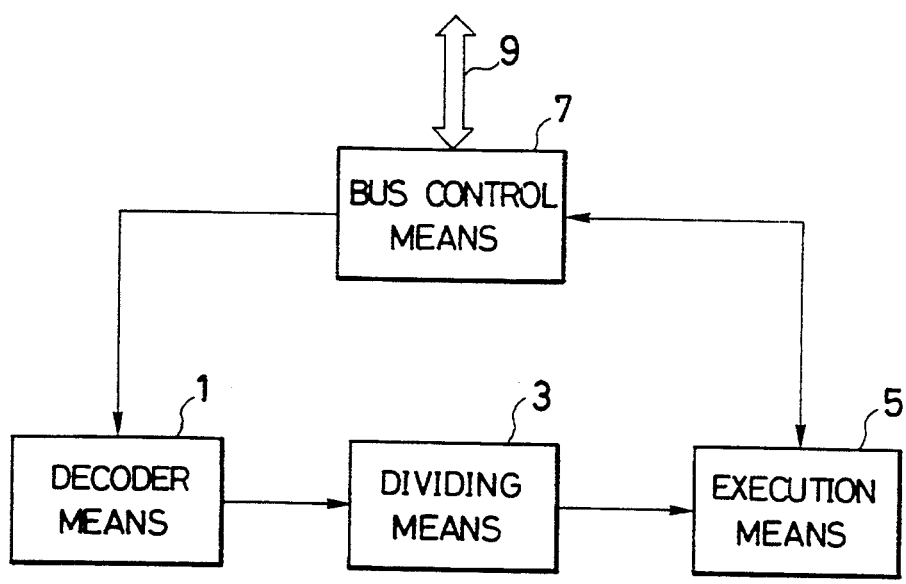

FIG.4
(A) 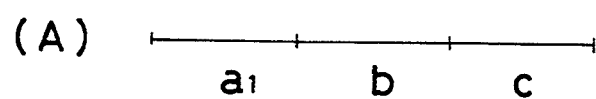
(B) 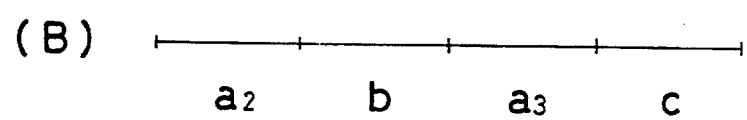
(C) 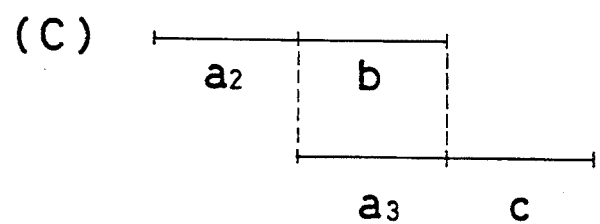

PIPELINE PROCESSING SYSTEM AND MICROPROCESSOR USING THE SYSTEM

This application is a continuation of application Ser. No. 07/517,542, filed Apr. 27, 1990, now abandoned, which is a continuation of application Ser. No. 06/934,860, filed Nov. 25, 1986, now abandoned.

BACKGROUND OF THE INVENTION

1. Field of the Invention

The present invention relates to a pipeline processing system and a microprocessor using the pipeline processing system, particularly to a pipeline processing system capable of executing each command having a plurality of memory operands respectively at high speed and its microprocessor.

2. Description of the Prior Art

In recent microprocessors, a so-called pipeline processing system is used in order to perform a high speed operation of each command. In the pipeline processing system, commands are divided into a plurality of stages and are executed by operating the stages in parallel, so as to improve the processing speed of the commands.

In these microprocessors in which commands are executed according to the pipeline system, in order to execute each of the commands having a plurality of memory operands in the microprocessors according to the prior art, effective addresses corresponding to each of the memory operands are calculated when each of the commands of the machine language is converted into a particular instruction style adapted to the pipeline processing.

For the purpose of calculating the effective addresses of the memory operands for a single command, the effective address corresponding to each memory operand was calculated independently by a plurality of effective address calculating circuits for calculating the effective address of the memory operand by providing the same number of the circuits as that of the memory operands in the microprocessors according to the prior art.

However, the provision of the plurality of effective address calculating circuits in the microprocessor resulted in a disadvantage that the microprocessor became excessively complex and it became large in size.

On the other hand, a method has also been proposed heretofore that the effective addresses corresponding to a plurality of memory operands are calculated successively one by one through a single effective address calculating circuit. According to this method, each of the effective addresses corresponding to the plurality of the memory operands can be calculated by the single effective address calculating circuit, as well. The calculation of the effective addresses, however, resulted in a problem that the execution time for the commands having a plurality of memory operands is delayed since the calculation had to be done successively for every one of the memory operands. Consequently, a high speed execution of the commands having a plurality of memory operands can not be performed in the latter case, as well.

SUMMARY OF THE INVENTION

It is therefore an object of the present invention to provide an improved pipeline processing system and microprocessor using the system in which each command having a plurality of memory operands can be executed in high speed without making the construction of the processor complex and without making the size of the microprocessor large.

It is another object of the present invention to provide an improved pipeline processing system and microprocessor in which each command having a plurality of memory operands is divided into a plurality of inner commands which have a single memory operand respectively, and each of the inner commands thus divided is executed so as to calculate one effective address of one memory operand and to read the other memory operand from another effective address simultaneously.

One feature of the present invention resides in a pipeline processing system using a microprocessor having a single effective address calculating circuit wherein each command sent from the microprocessor and having a plurality of memory operands respectively is divided into a plurality of inner commands each having a single memory operand, and the calculation of at least one effective address of one memory operand and the processing of the other operand are performed simultaneously in a certain time period.

Another feature of the present invention resides in a microprocessor of the pipeline processing type which comprises: decoding each of the commands sent from external means and for determining if a particular command has a plurality of memory operands; dividing means connected to the decoder means for dividing the command having the plurality of memory operands into a plurality of inner commands each having a single operand respectively; execution means connected to the dividing means for successively executing each inner command thus divided and having a single memory operand; and bus control means connected between the decoder means and the execution means as well as to a bus, for controlling the transfer of information among them.

These and other objects, advantages and features of the invention will be better understood from the following detailed description of the embodiments with reference to the accompanying drawings.

BRIEF DESCRIPTION OF DRAWING

FIG. 1 is a block diagram of the construction of the microprocessor according to the present invention, FIG. 2 indicates a command having a plurality of memory operands, sent from external means, and a plurality of inner commands divided, FIG. 4 shows functional timing charts of the microprocessors according to the prior art and a function timing chart of the microprocessor according to the present invention.

DESCRIPTION OF THE PREFERRED EMBODIMENTS

Figure 3:
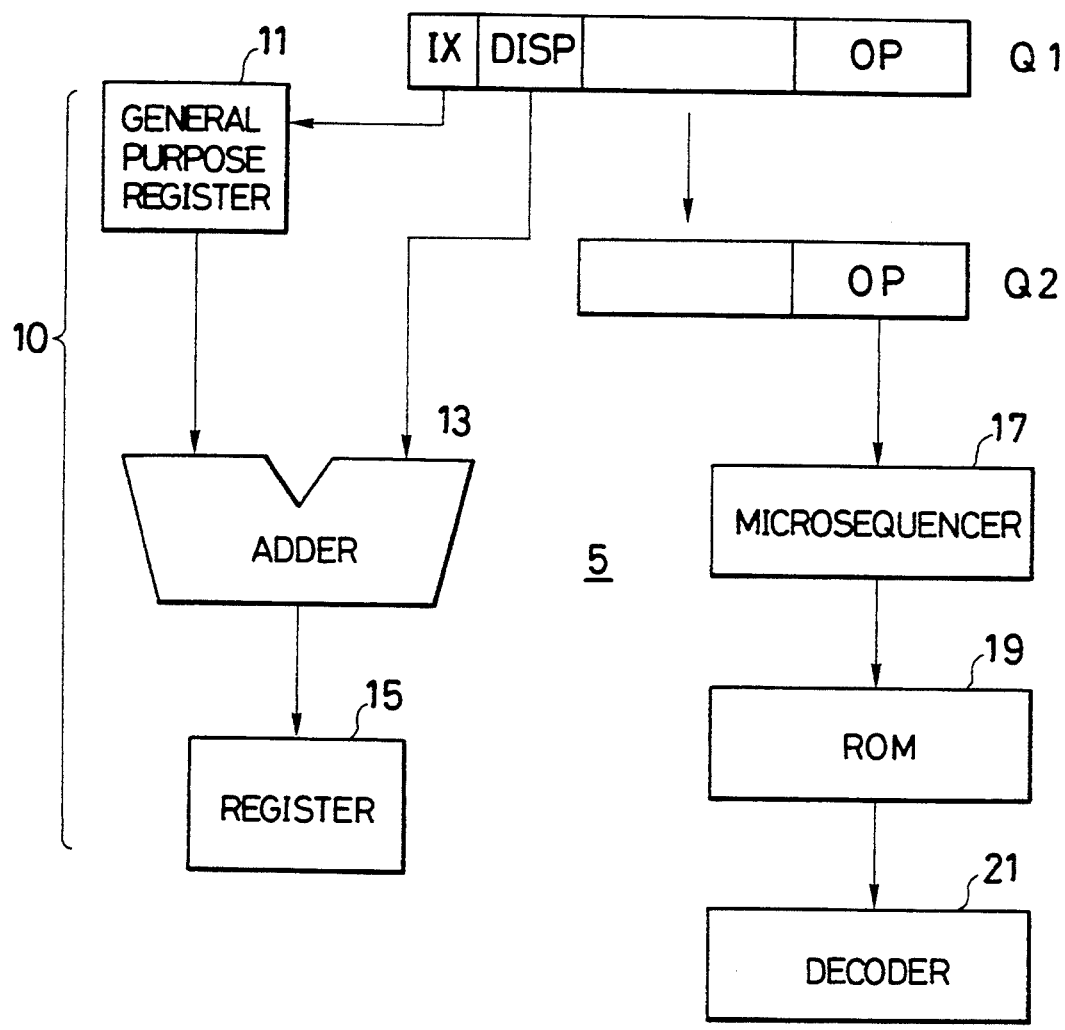
FIG. 3 is a detailed construction of the execution means of FIG. 1.

Referring to FIG. 1, the microprocessor according to the present invention comprises decoder means 1, divider means 3, execution means 5 and bus control means 7.

The decoder means 1 is connected through a bus 9 to a main memory not shown, in which commands of a machine language have been stored. The commands of the machine language picked up from the main memory are applied to the decoder means 1 through the bus 9.

The decoder means 1 decodes each of the commands thus applied and determines if any of command thus received has a plurality of memory operands. When the command in question is found to be one having a plurality of memory operands, it is applied to the dividing means 3.

The dividing means 3 divides each of the commands having a plurality of memory operands into a plurality of any executable type commands respectively which are referred to hereinafter as "inner commands", each having a single memory operand, as will be explained and shown later. The inner commands thus divided are applied to the execution means 5 which has a single effective address calculating circuit and a microsequencer both of which are not shown here but will be shown later. The microsequencer in the execution means 5 designates the sequence of execution of the inner commands thus applied and a predetermined sequence of execution is performed for each of the inner commands.

More particularly, let us assume that one of the commands is, for example, like a command PUSH DISP (I×2) having two memory operands as shown in FIG. 2(a) which is applied to the decoder means 1 for decoding and is then applied to the dividing means 3 for dividing. The command is one for forming one effective address (i.e., address A) of one memory operand by summing a value in the zone DISP thereof to the content of a general purpose register designated by the field (I×2) while storing other effective address (i.e., address B) of the other memory operand by the field (I×1).

When the command PUSH DISP (I×2) of FIG. 2(a) is applied to the dividing means 3, it divides the command having the two memory operands (I×1) and (I×2) into the inner commands consisting of a load command LD DISP (I×2) for reading out the memory operand stored in the address A in the main memory, and a store command ST (I×1) for storing a memory operand into the address B of the main memory, as shown in FIG. 2(b) and (c). Then, the inner commands of the load LD DISP (I×2) and the store ST (I×1) are applied to the execution means 5.

The execution means 5 executes the inner commands thus supplied from the divider means 3 according to the pipe-line processing system.

The bus control means 7 controls the bus 9 which carries out the reading of each of the machine language commands and the transfer of the memory operands, so as to apply the commands from the main memory to the bus control means 7 and then to the decoder means 1 through the bus 9.

FIG. 3 shows a detailed construction of the execution means 5 of FIG. 2. The execution means 5 comprises an effective address calculating circuit 10 for calculating the effective address of each of the memory operands, a microsequencer 17, a ROM 19, and a decoder 21, as well as stages $Q_1$ and $Q_2$.

The effective address calculating circuit 10 consists of a general purpose register 11, an adder 13, and a register 15. The general purpose register 11 includes a plurality of registers and each of the registers is designated by the field (I×1) or (I×2) etc. of the inner commands, where information to be used in each calculation of the effective address of the memory operand has been stored.

The adder 13 is for adding the information stored in a modification register in the general purpose register 11 which is designated by the field (I×1), or (I×2), etc. of each of the inner commands and the information of the zone DISP of the inner commands. Namely, the adder 13 calculates the effective address by adding the content of the modification register designated by the field (I×2) of each of the inner commands and the content of the zone DISP of each of the inner commands.

The register 15 is for storing the effective address thus calculated by the adder 13.

The microsequencer 17 is for supplying each address to the ROM 19, into which microcommands or microinstructions corresponding to each of the inner commands have been stored, in accordance with an operational code in the OP zone of the inner command. The decoder 21 is for decoding or interpret each of the microinstructions thus read from the ROM 19.

The operation of the preferred embodiment of the microprocessor according to the present invention thus constructed will now be made with reference to FIGS. 1 to 3.

When a command of a machine language, having a plurality of memory operands, is applied to the decoder means 1 from the bus 9 through the bus control means 7, it is decoded in the decoder means 1. Assuming now that the command is, for instance, like the PUSH DISP (I×2) having two memory operands (I×1) and (I×2) as shown in FIG. 2(a), the operation will be performed as follows;

The push command decoded in the decoder means 1 is applied to the divider means 3, where it is divided into two inner commands consisting of a load command of LD DISP (I×2) and a store command of ST (I×1), as shown in FIG. 2(b) and (c). Among each of the inner commands thus divided, the load command is firstly applied to the execution means 5 where the load command LD DISP (I×2) is set up at the stage Q1 of a pipeline system as shown in FIG. 3, and the content of the modification register not shown in the general purpose register 11, designated by the field I×2of the load command is read out. The content of the modification register thus read is added to the content of the zone DISP of the same load command in the adder 13 and a resulting effective address, i.e., address A is stored in the register 15.

After the above operation, the load command is moved to the stage Q2 of the pipeline system, where the load command is again executed. The microinstruction corresponding to the load command stored in the ROM address is read out of the ROM 19 and it is then decoded in the decoder 21.

The microinstruction thus coded in the decoder 21 permits the memory operand to be read from the address A as an effective address of the load command, stored in the register 15 of the main memory.

Furthermore, at the same time when the load command is set up at the stage Q2 of the pipeline system, the store command ST (I×1) is set up at the stage Q1 of the pipe-line system. Then, the content of the modification register, not shown in the general purpose register 11, which is designated by the field of (I×1) of the store command, that is, the other effective address of the store command as the address B is read out of it and it is stored in the register 15.

After this operation, the store command is moved to the stage Q2 of the pipeline system, where a microinstruction corresponding to the store command is read from the ROM 19 in the similar manner as in the load command. The microinstruction thus read permits the memory operand, which has been read from the address A in the main memory by the load command, to be written in the other effective address of the store command, i.e., in the address B.

In this manner as described, the push command of PUSH DISP (I×1) (I×2), for instance, is divided into an load command LD DISP (I×2) and a store command of ST (I×1) and the execution of the load command can be performed simultaneously with the calculation of the effective address of the store command, in the present invention.

In this respect, in a microprocessor having two effective address calculating circuits according to the prior art, a command having two memory operands is executed in such a manner that the calculations of one effective address as an address A which corresponds to one memory operand and of the other effective address as an address B which corresponds to the other memory operand are performed in the time duration $a_1$, while the reading-out of the operand from the address A is performed in the time duration b and the writing of the other operand into the address B is performed in the time duration of c. In other words, they are performed at the execution speed of three clocks, as shown in FIG. 4 (A).

FIG. 4 (B) shows how the calculation of the effective addresses of the operands and the read/write operation are performed by a single effective address calculating circuit according to the prior art, with respect to a command having two memory operands. Namely, in this system according to the prior art, the calculation of the address A is carried out during the time period of $a_2$ and the reading-out of the operand from the address A is carried out in the time period of b, while the calculation of the address B is carried out in the time period of $a_3$ and the writing of the other operand read out of the address A is carried out in the time period of c. In other words, the operation is performed over the four clock periods, as shown in FIG. 4 (B).

Whereas in the microprocessor according to the present invention, the calculation of the address A is performed in the time period of $a_2$, and the reading of the operand in the address A is performed in the time period of b similar to FIG. 4(A), but the calculation of the address B can be performed simultaneously in the time period of either b or $a_3$. Namely, the operation can be carried out within three clock speeds by the use of a single effective address calculating circuit, according to the present invention.

As described in the foregoing embodiments of the pipe line-processing system and the microprocessor according to the present invention, since each of commands having a plurality of memory operands respectively are divided into a plurality of inner commands each having a single memory operand and they are successively executed according to the pipeline processing system, the calculation of one effective address and the processing of the other effective address of memory operands can be performed simultaneously. As a result, the execution speed of the commands having a plurality of memory operands respectively can be improved in the microprocessor according to the present invention without using a plurality of effective address calculating circuits.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A data processing method comprising the steps of:
   inputting a machine language instruction from a computer program input into a microprocessor;
   determining whether the machine language instruction has more than one memory operand;
   creating, in the microprocessor, from the machine instruction having a plurality of memory operands, a plurality of inner instructions including at least a first and second inner instruction each of said inner instructions having a single memory operand;
   executing the first and second inner instruction through a single pipeline; and
   simultaneously calculating an address of an operand of said second inner instruction while processing said first inner instruction.

2. A pipelined data processing system comprising:
   first means for receiving and decoding a machine instruction and determining whether or not said machine instruction has two or more memory operands and generating two or more inner instructions equivalent to said machine instruction if said machine instruction has two or more operands, each inner instruction having a single memory operand;
   second means for generating an operand address for each inner instruction;
   a ROM connected with said first means for receiving operational codes of said inner instructions in order to output microinstructions stored in said ROM and required to execute said inner instructions;
   a decoder connected with said ROM for decoding said microinstructions; and
   third means connected with said decoder to execute said microinstructions of said inner instructions decoded by said decoder in a pipelined manner.

3. A pipelined data processing system comprising:
   first means for sequentially decoding machine instructions into a sequence of inner instructions, each of said inner instruction containing information about operand address generation and an operational code;
   second means for sequentially generating operand addresses in accordance with said information;
   third means for sequentially fetching microinstructions in accordance with said operational code of each instruction; and
   means for executing said microinstructions using said operand addresses,
   wherein said first means determines whether or not said machine instructions respectively have a plurality of operands and generates a plurality of said inner instructions having single operands respectively for each machine instruction having a plurality of operands.

4. A data processing system for processing data through a pipeline comprising:
   a decoder means for decoding a machine instruction to obtain a first decoded information item corresponding to said machine instruction, said first decoded information item including an operational code and information about one or more operands;
   a dividing means connected with said decoder means for receiving said first decoded information item and judging whether or not said machine instruction has a plurality of operands, said dividing means converting said first decoded information item into a plurality of second decoded information items when said first decoded information item indicates a plurality of operands are contained in said machine instruction, each of said plurality of second decoded information items comprising an operational code and information about a single operand;

an operand address generating means connected with said dividing means for receiving said information about said single operand and calculating an operand address for said single operand according to said information about said single operand;

a microinstruction execution means connected with said dividing means for receiving said operational code from each of said second decoded information items and for executing microinstructions relating to said single operand.

5. A data processing system as claimed in claim 4 wherein said microinstruction execution means comprises:

a first register stage receiving said second decoded information items;

a second register stage connected to said first register stage, receiving said operational code of each of said second decoded information items;

a microsequencer receiving said operational code from said second register and generating a sequence of addresses corresponding to said operational code; and a ROM, supplied with said sequence of addresses, in which microinstructions corresponding to said operational code are stored.

6. A data processing system as claimed in claim 5 wherein said operand address generating means comprises:

a first register having a plurality of registers containing said information about said single operand;

an adder connected to said first register and receiving a segment of said second decoded information used to calculate an effective address of said single operand from said first register stage; and a result register receiving the results from said adder and storing the effective address of said single operand.

* * * * *